United States Patent
Strzalka et al.

(10) Patent No.: US 12,447,877 B2
(45) Date of Patent: Oct. 21, 2025

(54) AIR CONDITIONING SYSTEM

(71) Applicant: AMI Industries, Inc., Colorado Springs, CO (US)

(72) Inventors: Boguslaw Strzalka, Nysa (PL); Adrian Tarnowski, Wrocław (PL)

(73) Assignee: AMI Industries, Inc., Colorado Springs, CO (US)

( * ) Notice: Subject to any disclaimer, the term of this patent is extended or adjusted under 35 U.S.C. 154(b) by 108 days.

(21) Appl. No.: 17/964,665

(22) Filed: Oct. 12, 2022

(65) Prior Publication Data

US 2023/0140582 A1 May 4, 2023

(30) Foreign Application Priority Data

Oct. 29, 2021 (EP) ..................................... 21461611

(51) Int. Cl.
- *B60N 2/56* (2006.01)
- *B60H 1/00* (2006.01)
- *B60N 2/75* (2018.01)

(52) U.S. Cl.
CPC ....... *B60N 2/5657* (2013.01); *B60H 1/00285* (2013.01); *B60N 2/79* (2018.02)

(58) Field of Classification Search
CPC ....... B60N 2/5621; B60N 2/79; B60N 2/5657
USPC .................................................. 297/227–228
See application file for complete search history.

(56) References Cited

U.S. PATENT DOCUMENTS

| | | |
|---|---|---|
| 10,555,372 B2 | 2/2020 | Ji et al. |
| 10,618,439 B2 | 4/2020 | Durkee et al. |
| 2008/0012398 A1 | 1/2008 | Alacqua et al. |
| 2009/0058120 A1 | 3/2009 | Ioka et al. |
| 2013/0299128 A1 | 11/2013 | Bergamini |
| 2018/0162243 A1 | 6/2018 | Akaike et al. |
| 2018/0201165 A1* | 7/2018 | Rekow ..................... B60N 2/79 |
| 2018/0361891 A1 | 12/2018 | Kato et al. |
| 2021/0276466 A1* | 9/2021 | Ketels .................... B60N 3/103 |

FOREIGN PATENT DOCUMENTS

| | | |
|---|---|---|
| CN | 2936835 | 8/2007 |
| CN | 203293949 U | 11/2013 |
| CN | 205239345 U | 5/2016 |

(Continued)

OTHER PUBLICATIONS

Translated specification, JP-2006218902 (Year: 2006).*
Extended Search Report in European Application No. 21461611.2 dated Apr. 14, 2022, 9 pages.

*Primary Examiner* — David R Dunn
*Assistant Examiner* — Tania Abraham
(74) *Attorney, Agent, or Firm* — Suiter Swantz IP

(57) ABSTRACT

An air conditioning system for a seat, comprising an arm rest (4a, 4b) of the seat, the arm rest having a top side, an inner wall, an outer wall, a front end, and a back end defining a hollow interior between them, means for providing air conditioned to a desired temperature, from an air source to the hollow interior of the arm rest, and a plurality of nozzles formed through the inner wall, defined between a nozzle inlet on an inner surface of the inner wall facing into the hollow interior and a nozzle outlet on an outer surface of the inner wall facing towards a seating area of a person when sitting in the seat, the nozzles providing a path through which air flows from the hollow interior, into the nozzle inlet and out of the nozzle outlet.

10 Claims, 4 Drawing Sheets

(56) References Cited

FOREIGN PATENT DOCUMENTS

| | | | |
|---|---|---|---|
| CN | 104999944 | B | 10/2017 |
| CN | 108050635 | A | 5/2018 |
| CN | 208411587 | U | 1/2019 |
| CN | 106183725 | B | 3/2019 |
| CN | 209534824 | U | 10/2019 |
| CN | 212861189 | U | 4/2021 |
| DE | 10225292 | A1 | 12/2003 |
| DE | 10241571 | A1 | 3/2004 |
| JP | H0357415 | A | 3/1991 |
| JP | 2005255000 | A | 9/2005 |
| JP | 2006218902 | A | 8/2006 |
| JP | 2017218046 | A | 12/2017 |
| JP | 6794812 | B2 | 12/2020 |
| KR | 20150139228 | A | 12/2015 |
| KR | 101644987 | B1 | 8/2016 |
| KR | 20180105958 | A | 10/2018 |
| KR | 20200119522 | A | 10/2020 |
| WO | WO-2019230089 | A1 * | 12/2019 ......... B60H 1/00278 |

* cited by examiner

AIR CONDITIONING SYSTEM

CROSS-REFERENCE TO RELATED APPLICATION

The present application claims the benefit of European Patent Office filing Patent Application No. 21461611.2, filed Oct. 29, 2021, entitled AIR CONDITIONING SYSTEM, which is incorporated herein by reference in the entirety.

TECHNICAL FIELD

The present disclosure is concerned with providing conditioned air to a space around a seated person in e.g. but not exclusively, a vehicle or an aircraft or in another area where the person is seated in a seat and requires cooled and/or warmed air for health and/or comfort.

BACKGROUND

Air conditioning systems are known in many fields to provide clean and comfortable air to people in enclosed spaces such as in rooms or vehicles.

Aircraft cabins, for example, generally have their air temperature regulated for the safety and comfort of passengers by an environmental conditioning system (ECS) that is controlled to ensure that the cabin air is clean and fresh and at the required temperature. In addition, passengers have air vents or blowers in the panel above their heads to provide additional cooling to the individual passenger as required. Passengers in business class or first class seats may also have individual heaters/coolers positioned under their seats. These passengers are able to adjust the temperature of the environment around their seat individually.

Whilst, as mentioned above, in aircraft the ECS operates to keep the cabin air comfortable, the fuel cost to cool the cabin air with conventional ECS systems is high. Where an aircraft is, for example, not full or where some passengers do not actually want or need the air temperature to be cooled to a given temperature, this is a wasted expense.

Design consideration is currently being given to increasing the efficiency of aircraft systems including reducing the fuel consumed in operating the ECS. Various ECS systems have been developed that e.g. use recirculated cabin air or other methods to reduce fuel consumption. Another way of reducing fuel consumption of the ECS that is currently being considered is to allow the cabin temperature to actually be higher than has conventionally been selected, thus requiring less fuel in cooling the cabin temperature.

A problem with this approach is that the higher cabin temperature might not be comfortable or optimal for every passenger.

As mentioned above, in some aircraft, passengers in areas of the cabin where the passenger has a relatively large seat space e.g. in business or first class may have their own individual air conditioning devices. These are usually in the form of a heat exchanger unit for example as described above, mounted in a manifold and located under the passenger's seat. The manifold usually has a number of outlets for the cooled or warmed air to exit to the seating area of the passenger. The manifold generally houses the heat exchanger components and has a flow channel for the air that has undergone heat exchange. The flow channel starts at an inlet which collects air from the heat exchanger, the channel then follows a circular path around the blower and has one or more outlets circumferentially offset with respect to the circular path from the inlet. The circular flow path may extend more than 360 degrees forming concentric circles around the blower. The overall width of the manifold is defined by the dimensions of the flow channel and the number for turns the channel makes around the blower—the more turns, the greater the width.

In business class and first class or similar parts of the aircraft cabin, there is generally enough space under the seat for a manifold of large enough surface area to provide sufficient temperature control to the passenger. In other parts of the cabin, such as economy class, for example, the seats are less wide and there is not sufficient area under the seats for the sorts of units currently used in the higher/more expensive class seat areas. This means that it is not feasible to have such individual environment control units under every passenger seat and so it has not been feasible to introduce fuel saving ECSs in aircraft that result in a higher overall cabin air temperature.

More compact heat exchanger systems are being developed that can be incorporated in other seat spaces. In addition, systems are being developed in which cooled (or warmed) air is channelled from the heat exchanger outlet through or behind the seat cushion forming the seat pad and/or back rest of the seat. Such systems can improve passenger comfort by providing comfortable temperatures where different parts of the person's body are located while the person is seated. This avoids one part of the person's body being cool and another part being warm.

Even with such temperature controlled seats, however, if the general temperature of the aircraft cabin (or other space where the person is seated) is relatively high (or cold), those parts of the person's body not in direct contact with the seat—e.g. the person's knees, thighs, chest, etc. may experience a temperature substantially warmer (or colder) than the rest of their body, which can cause discomfort.

There is, therefore, a need for an improved air conditioning assembly that can provide warmed or cooled air from a heat exchanger outlet to parts of the person's body that are not in direct contact with the seat pad and back rest.

SUMMARY

According to one aspect, there is provided an air conditioning system for a seat, comprising an arm rest of the seat, the arm rest having a top side, and inner wall and an outer wall, a front end and a back end defining a hollow interior between them, means for providing air conditioned to a desired temperature, from a source to the hollow interior of the arm rest, and a plurality of nozzles formed through the inner wall, defined between a nozzle inlet on an inner surface of the inner wall facing into the hollow interior and a nozzle outlet on an outer surface of the inner wall facing towards a seating area of a person when sitting in the seat, the nozzles providing a path through which air flows from the hollow interior, into the nozzle inlet and out of the nozzle outlet.

A conduit may direct air from a source of conditioned air into the hollow interior of the arm rest.

The nozzles may be shaped e.g. to form a straight flow path from their nozzle inlet to their nozzle outlet. Other shapes are also possible, e.g. the nozzle inlets may be offset with respect to the nozzle outlets to define a directed flow path.

One or more nozzles may also be formed through the top side and/or the front end of the arm rest.

The nozzles may have various locations e.g. they may be arranged in a plurality of rows along the inner side wall.

According to another aspect, there is provided a seat comprising a seat pad, a seat back and one or two arm rests defining between then a seating area for a person, and an air conditioning system as defined above for providing conditioned air to front parts of the body of a person sitting on the seat pad and resting against the back rest, via the plurality of nozzles. The air source may, for example, be located beneath the seat pad

BRIEF DESCRIPTION OF THE DRAWINGS

Non-limiting examples of assemblies according to the disclosure will now be described with reference to the drawings. It should be noted that variations are possible within the scope of the claims.

The examples are described as used in an aircraft passenger seat, but the same principles can be used in seats in other settings or locations and the disclosure is not limited to aircraft seats.

DETAILED DESCRIPTION

The air conditioning system according to this disclosure makes use of the arm rest(s) of a seat to direct conditioned air inwards across the seat pad area such that the air is directed to the front of the body of a person sitting in the seat. The arm rest(s) of a seat are generally hollow and use can be made of the hollow space to incorporating one or more channels for the flow of conditioned air, the conditioned air is provided to the one or more channels in the arm rest(s) and outlet nozzles are provided in the side of the arm rest facing inwards towards the seating area of the seat where the seated person is located, the nozzles being shaped to eject conditioned air from the channel(s) in the arm rest(s) towards front parts of the person's body when seated e.g. the person's arms, knees, thighs and/or chest. Additional air nozzles may also be provided on other parts of the arm rest such as a top surface, where the user can rest their arm, and/or on the front end of the arm rest facing away from the seat back.

Examples of the system of the disclosure will now be described in more detail with reference to FIGS. 1 to 4.

Figure 1:
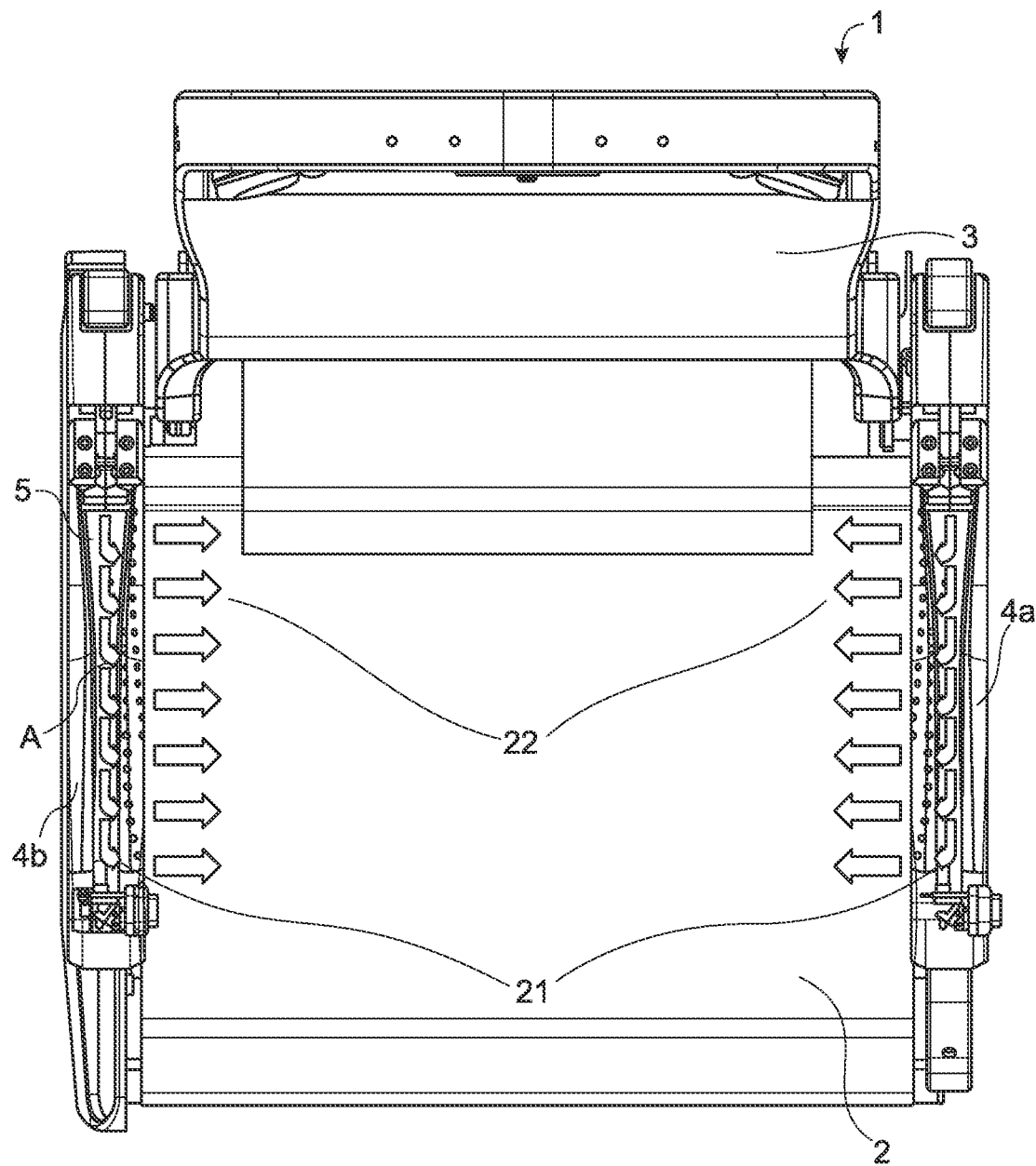
FIG. 1 shows a seat incorporating an air conditioning system according to an example of the disclosure.

FIG. 1 shows an example of a seat 1 having a seat pad 2 and a back rest 3 (i.e., seat back) together such that the person sits on the seat pad 2 and their back rests against the back rest 3. The seat pad and the back rest can be adjustable relative to each other to allow for different seating positions to increasing the comfort of the person in the seat. The seat pad 2 and back rest 3 are generally provided with cushioning to improving comfort but the concepts of this disclosure may also be used in a seat without any cushioning.

The seat 1 is further provided with an arm rest 4a, 4b on either side of the seat pad 2 to allow the person seated in the seat to rest their arms in a comfortable position while seated. Although two arm rests 4a, 4b are shown, a seat may also be provided with only a single arm rest and/or may share an arm rest with an adjacent seat.

The position of the arm rests 4a, 4b may be fixed or may be adjustable relative to the seat pad 2. For example, the arm rest may be pivotable to an open positioned, in which it is pivoted up towards the back rest 3 e.g. to allow the person to easily get out of the seat. In addition, or alternatively, the height of the arm rest 4a, 4b may be adjustable relative to the seat pad 2 to allow a comfortable rest position for persons of different side. Various shapes and sizes of arm rest are known. Arm rests can be contoured or shaped to be ergonomically advantageous or can be simply shaped where, for example, cost is a more important factor. Arm rests are commonly made of plastic material but other materials e.g. wood, metal etc. are also possible. Arm rests may be provided with a cushioned top surface to increase user comfort.

The seat is provided with an air conditioning system as described further below.

Conditioned air A, from a source of conditioned air (not shown) is provided to the interior of the arm rest(s) 4a, 4b. The source of conditioned air may be a heat exchanger positioned beneath or behind or above or adjacent the seat 1, but other sources are also feasible. The conditioned air may be conveyed from the source to the interior 10 of the arm rest 4a, 4b in any known way e.g. via channels or conduits. In some examples, conditioned air may also be provided to other parts of the seat, from the heat source, e.g. into the seat pad to provide a warming or cooling effect to the person's backside and the backs of their thighs in contact with the seat pad 2 and/or into the back rest to provide a warming or cooling effect to the person's back in contact with the back rest 3. Whether the conditioned air is warm or cool will depend on the requirements of the person at any time, and on the environment, and will be determined by the conditioned air source or control, e.g. by the heat exchanger. If warming or cooling is also provided to the back of the person via the seat pad 2 and/or the back rest 3, it may be desired to provide a corresponding effect, at the same or closely similar temperature to the front of the person.

The conditioned air A either fills a hollow cavity or flows through one or more channels 5 in the interior 10 of the arm rest and exits the arm rest via a plurality of openings or nozzles 20 formed through a side wall 41 of the arm rest that faces inwardly towards the seat area in which the person will be seated. The nozzles are shaped, located and directed in the side wall 41 so that the conditioned air can pass across the person's arms, knees, thighs and/or chest area when seated. The nozzles extend through the side wall 41 and are defined between a nozzle inlet 21 on the inner surface of the side wall 41, facing into the interior of the arm rest, and a nozzle outlet 22 defined in the outer surface of the side wall 41, facing into the seating area defined by the seat pad 2.

Figure 2:
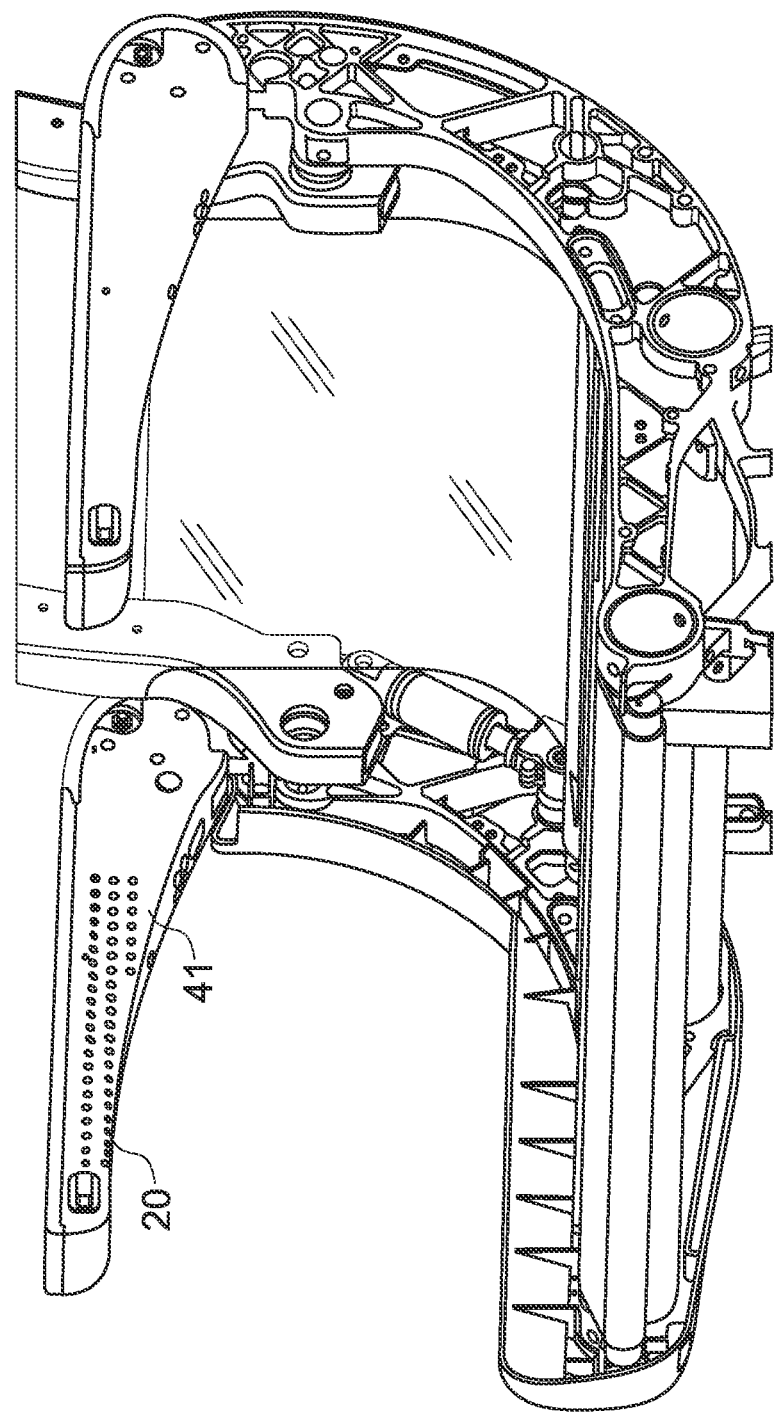
FIG. 2 is a perspective partial view of a seat incorporating an air conditioning system according to an example of the disclosure.
Figure 3:
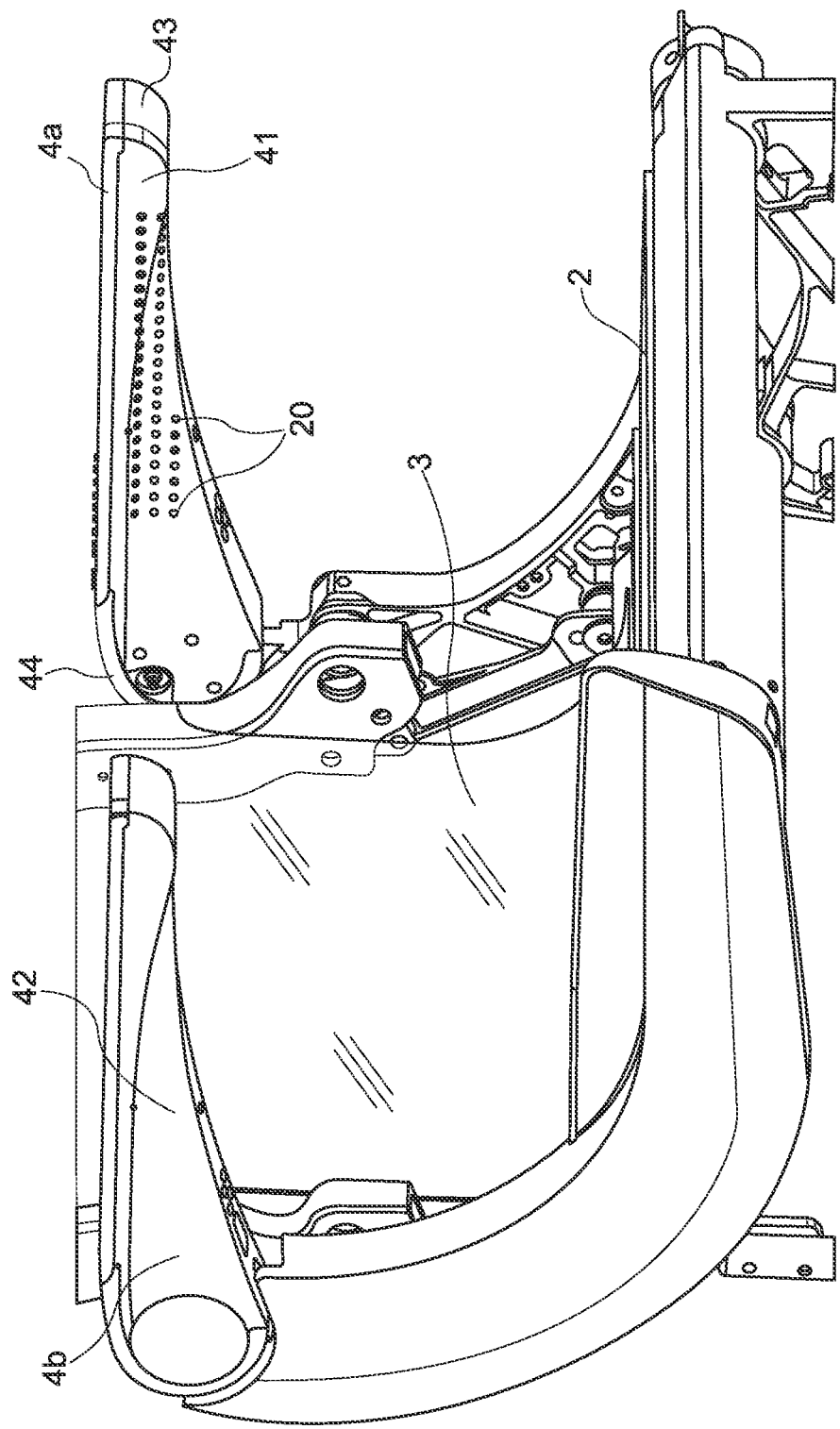
FIG. 3 shows the seat of FIG. 2 viewed from a different perspective.

FIG. 2 shows the basic structure of a seat having two arm rests with ventilation nozzles 20 according to the disclosure and FIG. 3 shows the seat from the opposite side. It is also within the scope of the disclosure that even for a seat with two arm rests, as shown, only one of the arm rests is provided with ventilation nozzles.

Figure 4:
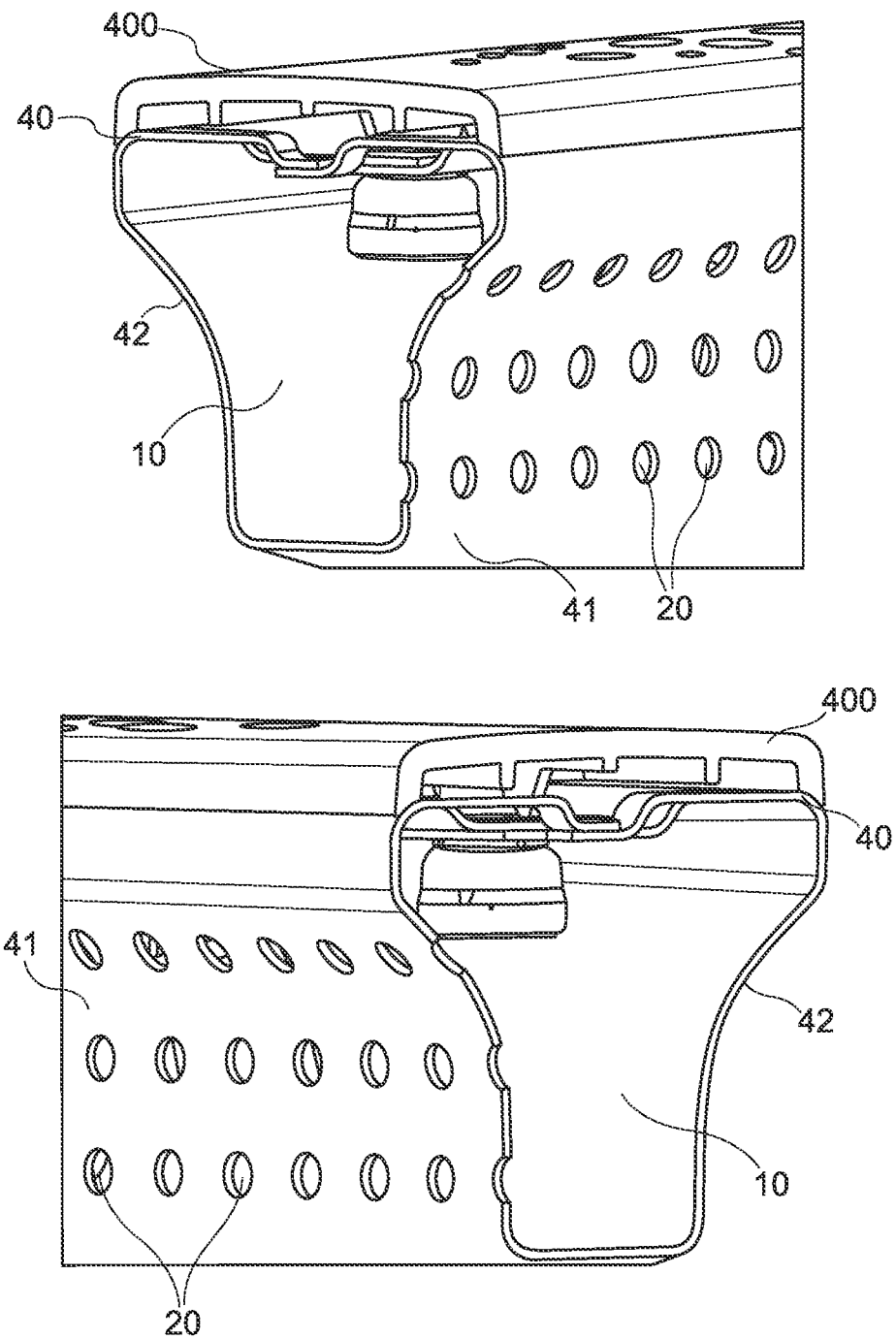
FIG. 4 shows a cut-away detailed view of seat armrests according to the disclosure.

The formation of the nozzles 20 in the side wall 41 of the arm rest 4a, 4b is shown in more detail in FIG. 4. The arm rest 4a, 4b has a top surface 40 on which the person's arm may rest, in use. Additional cushioning 400 or a protective cover may be provided over the top surface to provide additional comfort or to provide a removable and replaceable surface that can be easily removed and replaced in the event of damage or the like. Side walls 41, 42 extend down from the top surface 40 to form an inner side wall 41 facing towards the seated person, and an outer side wall 42 facing away from the seated person. The cut away view of FIG. 4 shows the holler interior 10 of the arm rest defined by the top and side walls.

The arm rests 4a, 4b will also have a front facing end 43 and a back end 44 attached to the structure of the seat 1.

The conditioned air A from the air source (not shown—various sources are possible) is provided to the interior 10 of the arm rest e.g. via pipes or conduits (not shown). The way in which the air is provided to the arm rest is not important to this invention and various manners are conceivable.

The nozzles 20 are formed extending through the inner side wall 41 such that the air in the interior 10 of the arm rest exits the nozzles through their outlets 22 to the area where the person is seated. The nozzles 20 should be formed at locations in the side wall where the exiting air will flow across the person's thighs and/or chest. The actual location will depend on the design and position of the armrest. Additional nozzles (not shown) may be formed in the top surface and/or the front end of the arm rest.

The nozzles 20 may be circular such that the air exits in a straight path through the nozzle from its inlet 21 to its outlet 22. Alternatively, the path through the nozzles 20 can be formed with some directionality e.g. so that the air is directed more towards the back of the seat, or more towards the person's chest or neck area, for example, by the nozzles being shaped so that the inlets and the outlets are slightly offset.

In the example, the nozzles 20 are formed in several rows across the side wall of the arm rest. The actual pattern, number and size of nozzles can be varied as required for any given situation.

The system provided by this disclosure allows a more personal and comprehensive air conditioning to be achieved using standard seat components and already available space in arm rests in a simple, inexpensive manner.

The invention claimed is:

1. An air conditioning system for a seat comprising:
an arm rest of the seat, the arm rest comprising a top surface, an inner wall, an outer wall, a front end, and a back end defining a hollow interior between them, the back end configured to be attached to a structure of the seat, the arm rest pivotable up toward a seat back of the seat to an open position relative to the seat;
a plurality of nozzles formed through the inner wall, defined between a nozzle inlet on an inner surface of the inner wall facing into the hollow interior and a nozzle outlet on an outer surface of the inner wall facing towards a seating area of a person when sitting in the seat, the plurality of nozzles providing a path through which air flows from the hollow interior, into the nozzle inlet and out of the nozzle outlet, wherein each of the nozzle inlet is offset with respect to the nozzle outlet to define the path, wherein the path is a directed flow path and is directed back towards the seat back of the seat; and
a protective cover over the top surface, the protective cover configured to be removable and replaceable.

2. The air conditioning system of claim 1, further comprising a conduit to direct the air from an air source of conditioned air into the hollow interior of the arm rest.

3. The air conditioning system of claim 1, further comprising one or more nozzles formed through the top surface of the arm rest.

4. The air conditioning system of claim 1, further comprising one or more nozzles formed through the front end of the arm rest.

5. The air conditioning system of claim 1, further comprising an air source in fluid flow connection with the hollow interior of the arm rest.

6. The air conditioning system of claim 5, wherein the air source comprises a heat exchanger.

7. The air conditioning system of claim 1, wherein the plurality of nozzles are arranged in a plurality of rows along the inner wall.

8. An air conditioning system comprising:
two arm rests on either side of a seating area of a seat, each arm rest comprising a top surface, an inner wall, an outer wall, a front end, and a back end defining a hollow interior between them, the back end attached to a structure of the seat, each arm rest pivotable up toward a seat back of the seat to an open position relative to the seat;
a protective cover over the top surface of each arm rest, the protective cover configured to be removable and replaceable; and
a plurality of nozzles formed through the inner wall, defined between a nozzle inlet on an inner surface of the inner wall facing into the hollow interior and a nozzle outlet on an outer surface of the inner wall facing towards the seating area of a person when sitting in the seat, the plurality of nozzles providing a path through which air flows from the hollow interior, into the nozzle inlet and out of the nozzle outlet, wherein each of the nozzle inlet is offset with respect to the nozzle outlet to define the path, wherein the path is a directed flow path and is directed back towards the seat back of the seat.

9. A seat comprising:
a seat pad;
a seat back; and
an air conditioning system comprising:
one or two arm rests defining between them a seating area for a person,
wherein each arm rest of the one or two arm rests comprises:
a top surface, an inner wall, an outer wall, a front end, and a back end defining a hollow interior between them; and
a protective cover over the top surface, the protective cover configured to be removable and replaceable;
wherein the back end of each arm rest is configured to be attached to a structure of the seat, wherein each arm rest is configured to be pivotable up toward the seat back of the seat to an open position relative to the seat; and
a plurality of nozzles formed through the inner wall, defined between a nozzle inlet on an inner surface of the inner wall facing into the hollow interior and a nozzle outlet on an outer surface of the inner wall facing towards the seating area of the person when sitting in the seat, the plurality of nozzles providing a path through which air flows from the hollow interior, into the nozzle inlet and out of the nozzle outlet,
wherein the air conditioning system is configured to provide the air conditioned to a desired temperature, via the plurality of nozzles, to front parts of a body of the person sitting on the seat pad and resting against the seat back, wherein each of the nozzle inlet is offset with respect to the nozzle outlet to define the path, wherein the path is a directed flow path and is directed back towards the seat back of the seat.

10. The seat of claim 9, further comprising an air source in fluid flow connection with the hollow interior of each arm rest, wherein the air source is located beneath the seat pad.

* * * * *